United States Patent
Jeon et al.

(10) Patent No.: US 7,171,502 B2
(45) Date of Patent: Jan. 30, 2007

(54) USB SYSTEM HAVING CARD-TYPE USB INTERFACE CONNECTOR

(75) Inventors: Tae-Keun Jeon, Yongin-shi (KR); Seong-hyun Kim, Yongin-shi (KR)

(73) Assignee: Samsung Electronics, Co., Ltd. (KR)

( * ) Notice: Subject to any disclaimer, the term of this patent is extended or adjusted under 35 U.S.C. 154(b) by 389 days.

(21) Appl. No.: 10/446,242

(22) Filed: May 28, 2003

(65) Prior Publication Data
US 2004/0044819 A1 Mar. 4, 2004

(30) Foreign Application Priority Data
Sep. 3, 2002 (KR) ............... 10-2002-0052729

(51) Int. Cl.
*G06F 13/00* (2006.01)
(52) U.S. Cl. .................... 710/300; 710/313
(58) Field of Classification Search ............ 710/300, 710/301, 305, 313
See application file for complete search history.

(56) References Cited

U.S. PATENT DOCUMENTS

| | | | | |
|---|---|---|---|---|
| 4,686,506 A | * | 8/1987 | Farago | ............ 341/100 |
| 5,254,018 A | * | 10/1993 | Sawada | ............ 439/680 |
| 5,954,523 A | * | 9/1999 | Babcock | ............ 439/79 |
| 6,148,354 A | * | 11/2000 | Ban et al. | ............ 710/301 |
| 6,725,286 B2 | * | 4/2004 | Takahashi | ............ 710/8 |
| 6,757,783 B2 | * | 6/2004 | Koh | ............ 711/115 |
| 6,779,059 B2 | * | 8/2004 | Han et al. | ............ 710/62 |
| 6,792,501 B2 | * | 9/2004 | Chen et al. | ............ 711/103 |
| 6,829,672 B1 | * | 12/2004 | Deng et al. | ............ 711/103 |
| 6,835,091 B2 | * | 12/2004 | Oleynick et al. | ............ 439/541.5 |
| 2003/0041203 A1 | * | 2/2003 | Jones et al. | ............ 710/301 |
| 2003/0084220 A1 | * | 5/2003 | Jones et al. | ............ 710/301 |
| 2004/0033727 A1 | * | 2/2004 | Kao | ............ 439/660 |
| 2004/0215910 A1 | * | 10/2004 | Okaue et al. | ............ 711/164 |
| 2005/0059301 A1 | * | 3/2005 | Chou et al. | ............ 439/660 |
| 2005/0114587 A1 | * | 5/2005 | Chou et al. | ............ 711/103 |

FOREIGN PATENT DOCUMENTS

JP 2002-074277 3/2002

* cited by examiner

*Primary Examiner*—Khanh Dang
(74) *Attorney, Agent, or Firm*—Mills & Onello LLP

(57) ABSTRACT

A universal serial bus (USB) system having a card-type USB interface connector includes a host platform, a storage layer, and an electrical interface. The host platform includes a USB host controller for controlling data transfer, and a first card-type connector at which data is transferred. The storage device includes a non-volatile memory device for storing data, a memory controller for controlling the non-volatile memory device, and a second card-type connector at which data is transferred with the first card-type connector. A plurality of electrical lines interconnecting the first and second connectors are disposed in the electrical interface. A USB control module converts transferred data into USB packets, and converts USB packets into data for transfer. The card-type USB interface connector of the USB system is used as a USB interface connector by means of a card-type plug. Thus, the card-type USB interface connector is readily installed in card-type connector interfaces.

6 Claims, 4 Drawing Sheets

USB SYSTEM HAVING CARD-TYPE USB INTERFACE CONNECTOR

FIELD OF THE INVENTION

The present invention generally relates semiconductor memory devices and, more particularly, to a USB system having a card-type USB interface connector.

BACKGROUND OF THE INVENTION

Erasable and programmable non-volatile memory devices (hereinafter referred to as "flash memory devices") are a popular form of information storage devices. As compared to a traditional magnetic disk, the relatively low cost and low power consumption associated with flash memory devices make such devices the preferred storage media for a wide variety of applications, including multimedia cards, compact flash cards or a smart media cards. Flash memory devices also find application in personal digital assistants (PDAs), digital cameras, and other mobile electronics.

In the peripheral device extension of a personal computer (PC), universal serial bus (USB) protocols have been utilized for readily achieving high data transfer rate at an economical price. Through the USB protocol, real-time transfer of voice, sound, and compressed video data can be realized. The USB protocol further provides functionality such as self-identification of computer peripheral devices and auto-mapping of drivers. By means of the USB protocol, data storage apparatus, for example PDAs, interface with PCs.

A conventional memory device having a USB interface connector card includes a plug-type connector, as shown in FIG. 1. The plug-type connector includes pins for a power supply signal, data signals D+ and D−, and ground signals. Memory devices having such a plug-type interface connector can be conveniently connected to a computer. However, when a memory device having such a plug-type interface connector is connected to portable apparatuses such as a PDA or a digital camera, a special port and an additional socket are required because such apparatuses commonly include a card-type interface connector.

SUMMARY OF THE INVENTION

The present invention is directed to a system which addresses the limitations of the aforementioned conventional embodiments. In particular, the present invention provides a USB system having a card-type interface connector.

A universal serial bus (USB) system having a card-type USB interface connector includes a host platform, a storage layer, and an electrical interface.

The host platform includes a USB host controller for controlling data transfer, and a first card-type connector at which data is transferred. The storage device includes a non-volatile memory device for storing data, a memory controller for controlling the non-volatile memory device, and a second card-type connector at which data is transferred with the first card-type connector. A plurality of electrical lines interconnecting the first and second connectors are disposed in the electrical interface.

A USB control module converts transferred data into USB packets, and converts USB packets into data for transfer.

In a first embodiment, the first and second connectors include nine pins and are card-type plugs which are compatible with a secure digital (SD) card, respectively. Of the nine pins, at least one pin is used as a power supply signal, at least one pin is used as a ground signal, at least one signal is used as a D+ digital signal, and at least one pin is used as a D− digital signal.

In a second embodiment, the first and second connectors include ten pins and are card-type plugs which are compatible with a memory stick, respectively. Of the ten pins, at least one pin is used as a power supply signal, at least one pin is used as a ground signal, at least one pin is used as a D+ digital signal, and at least one pin is used as a D− digital signal.

According to the present invention, a card-type plug whose connector is compatible with an SD card or a memory stick is used for the transfer of data according to the USB protocol. Thus, the card-type plug is readily installed in card-type connector interfaces.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

A universal serial bus (USB) system according to the present invention is now described below with reference to FIG. 2.

Figure 1:
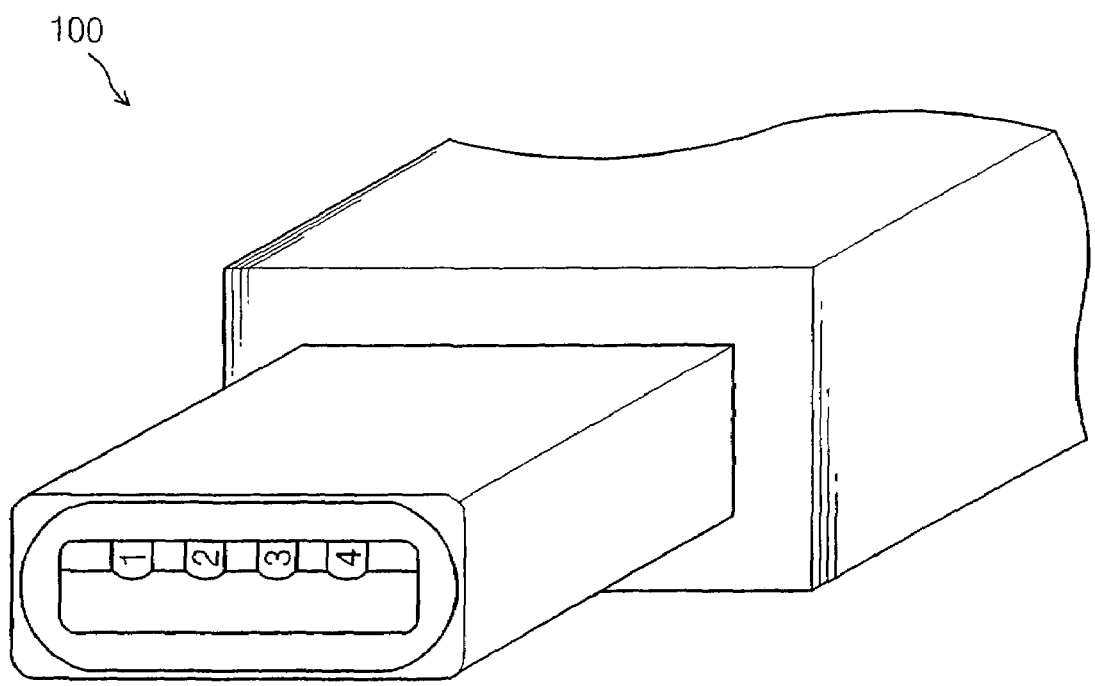
FIG. 1 is a perspective view of a conventional USB interface connector.
Figure 2:
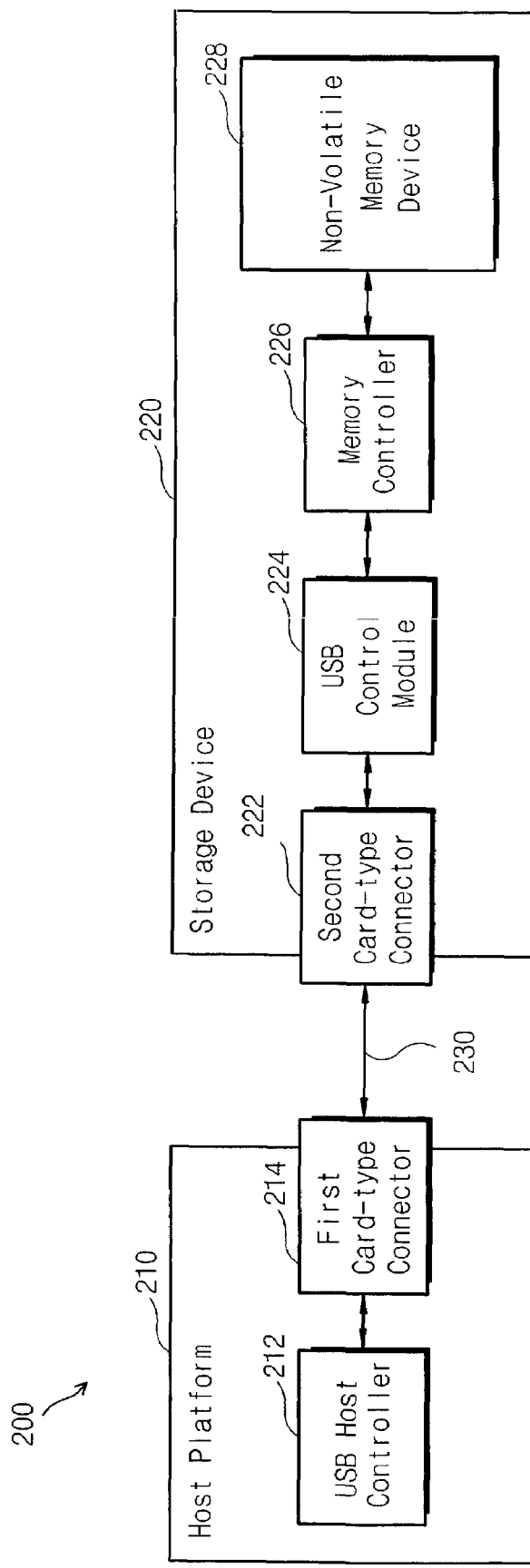
FIG. 2 is a block diagram of a USB system according to the present invention.

Referring to FIG. 2, a USB system 200 includes a host platform 210, a storage device 220, and an electrical interface 230. The host platform 210 includes a USB host controller 212 for controlling data transfer and a first card-type connector 214 to/from which data is transferred/received. The USB host controller 212 controls data transfer according to the USB protocol, for example, initializing data transfer, transferring USB packets indicating data transfer type, data transfer direction, USB device address, end point, and the like.

The storage device 220 includes a second card-type connector 222, a USB controller 224, a memory controller 226, and a non-volatile memory device 228. The non-volatile memory device 228 includes at least one flash memory in which data write, read, and erase operations are performed. The USB controller 224 converts an electrical signal transmitted to the second card-type connector into a logical USB packet. The memory controller 226 controls the writing of data to the non-volatile memory device 228, the reading of data from the non-volatile memory device 228, and the erasing of data in the non-volatile memory device 228. A plurality of electrical signal lines interconnecting the first and second card-type connectors 214 and 222 are disposed in the electrical interface 230. In one embodiment, the first card-type connector 214 includes a receptable connector, and the second card-type connector 222 includes a plug connector. Since there is a male-and-female relationship between the first and second card-type connectors 214 and 222, only the second card-type connector 222 will be explained herein.

Example embodiments of second card-type connector 222 are now described below with reference to FIG. 3 and FIG. 4 which show card-type connectors according to first and second embodiments of the present invention, respectively.

Figure 3:
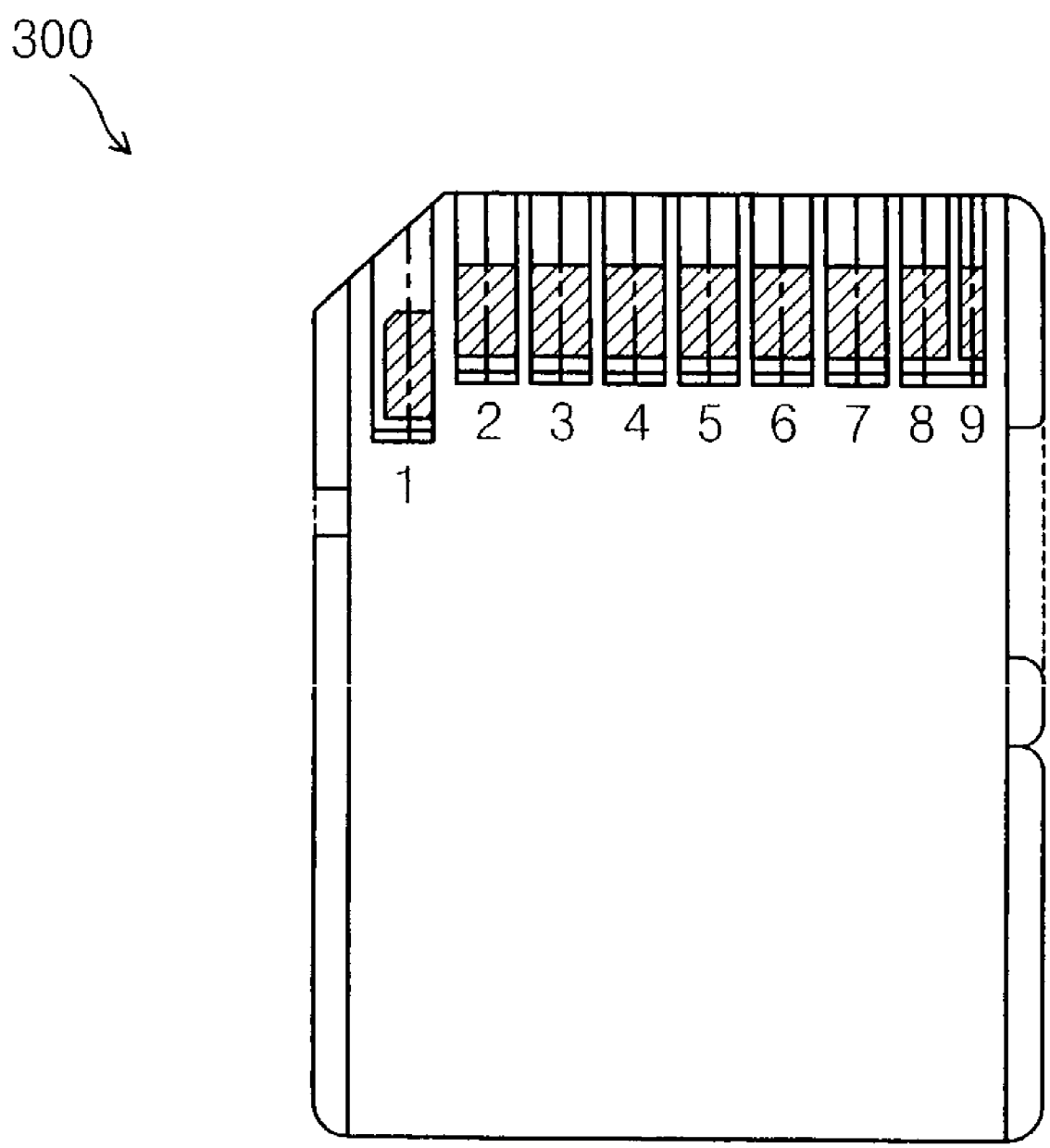
FIG. 3 is a conceptual view of a storage device having a USB interface connector according to a first embodiment of the present invention.

Referring to FIG. 3, a card-type connector 300, for example of the type compatible with a secure digital (SD) card, includes nine pins. Four standard USB interface signals, including the power supply signal Vbus, a ground signal GND, and data signals D+ and D−, are mapped to the nine pins. The standard USB interface signals Vbus, GND, D+, and D− may be mapped variously to the nine pins. In this example, the power supply signal Vbus is mapped to pin 5, the ground signal GND is mapped to pins 4 and 7, and the data signals D+, and D− are mapped to two pins selected from the group consisting of, for example, pins 1–3, pin 6, pin 8, and pin 9.

Figure 4:
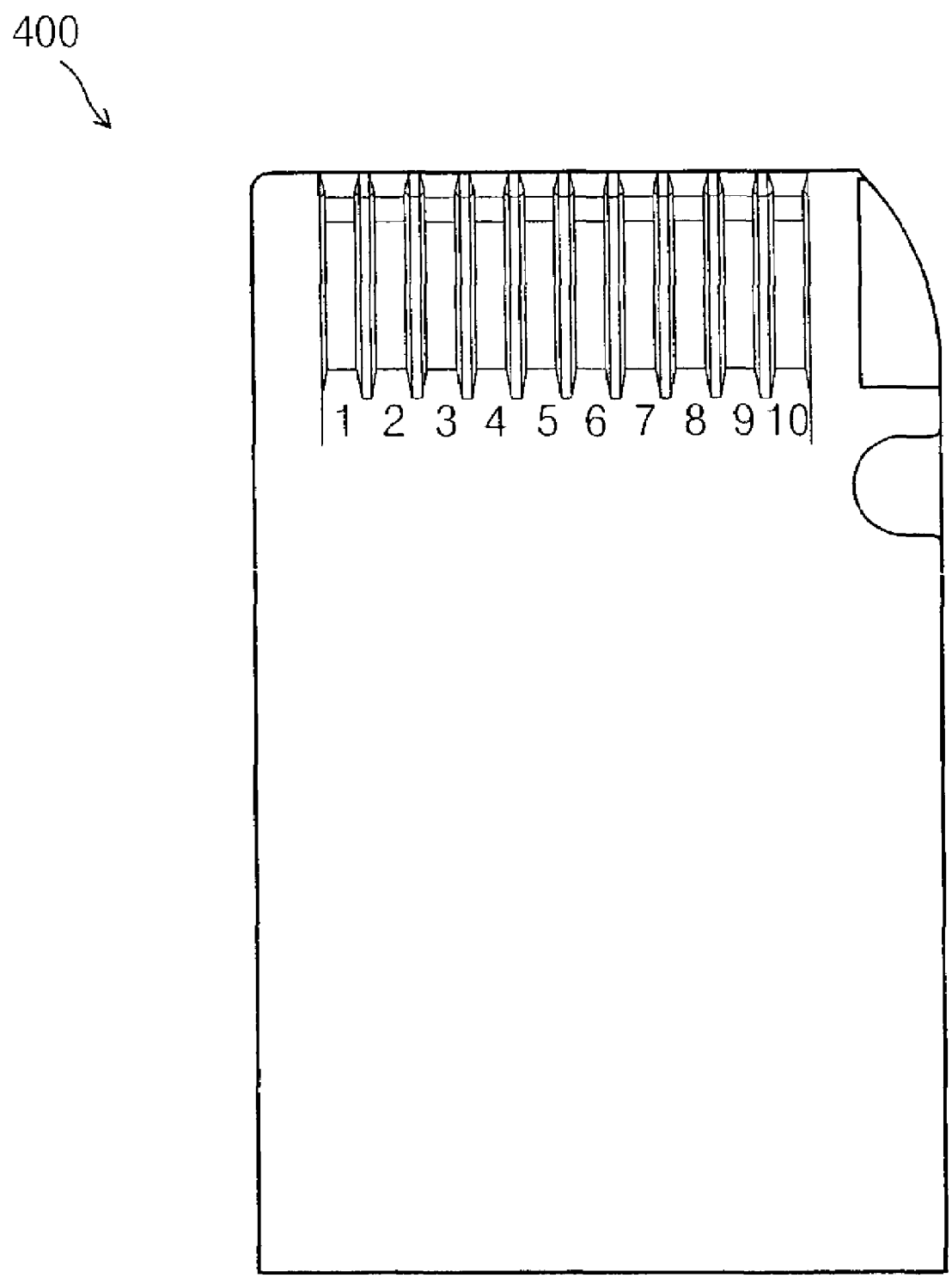
FIG. 4 is a conceptual view of a storage device having a USB interface connector according to a second embodiment of the present invention.

Referring to FIG. 4, this example of a card-type connector 400 is of a type that is compatible with a memory stick, and includes ten pins. In this example, a power supply signal Vbus is mapped to pins 2 and 8, a ground signal is mapped to pins 1 and 10, and data signals D+ and D− are mapped to at least two pins selected from the group consisting of, for example, pins 1–3, pin 6, pin 8, and pin 9. The pins of the card-type connector 400 may be variously mapped depending on the configuration of the host platform 210 (see FIG. 2).

As described above, the card-type USB connector according to the present invention is compatible with an SD card or a memory stick. In alternative embodiments, the card-type USB connector can be made compatible with other forms of card-based flash memory units, for example, an existing multimedia card (MMC). In this manner, the card-type connector of the present invention may be installed and used in existing card-type connector interfaces.

While this invention has been particularly shown and described with references to preferred embodiments thereof, it will be understood by those skilled in the art that various changes in form and details may be made herein without departing from the spirit and scope of the invention as defined by the appended claims.

For example, depending upon the storage capacity and purpose of a storage device, a card-type connector according to the invention may have various lengths. At the same time, the pins of the card-type connector may be variously mapped according to the requirements of a particular application.

What is claimed is:

1. A universal serial bus (USB) system comprising:
   a host platform including a USB host controller for controlling data transfer and a first card-type connector at which data is transferred;
   a storage device including a non-volatile memory device for storing the data, a memory controller for controlling the non-volatile memory device, and a second card-type connector at which data is transferred with the first card-type connector, and a USB control module for controlling data transfer to and from the host platform, including initialization of such data transfer, exclusively according to USB protocol through the second card-type connector; and
   an electrical interface including a plurality of electrical signal lines interconnecting the first and second card-type connectors, the plurality of electrical signal lines of the electrical interface exclusively consisting of USB protocol signal lines.

2. The USB system of claim 1, wherein the storage device further comprises the USB control module for converting the transferred data into a logical USB packet and for converting USB packets into data to be transferred.

3. The USB system of claim 1, wherein the first or second connector has nine pins and is a card-type plug which is compatible with a security digital (SD) card.

4. The USB system of claim 3, wherein of the nine pins, at least one pin is used as a power supply signal, at least one pin is used as a ground signal, at least one pin is used as a D+ data signal, and at least one pin is used as a D− data signal.

5. The USB system of claim 1, wherein the first or second connector has ten pins and is a card-type plug which is compatible with a memory stick.

6. The USB system of claim 5, wherein of the ten pins, at least one pin is used as a power supply signal, at least one pin is used as a ground signal, at least one pin is used a D+ data signal, and at least one pin is used as a D− data signal.

* * * * *